Jan. 9, 1968  S. R. TYLER  3,362,660

VEHICLE DYNAMIC BRAKING SYSTEMS

Filed Feb. 14, 1966  8 Sheets-Sheet 1

INVENTOR
STANLEY R. TYLER
BY
*Young & Thompson*
ATTORNEYS

Jan. 9, 1968        S. R. TYLER        3,362,660

VEHICLE DYNAMIC BRAKING SYSTEMS

Filed Feb. 14, 1966        8 Sheets-Sheet 5

INVENTOR
STANLEY R. TYLER
BY
ATTORNEYS

United States Patent Office 3,362,660
Patented Jan. 9, 1968

3,362,660
VEHICLE DYNAMIC BRAKING SYSTEMS
Stanley R. Tyler, 48 Bourneside Road,
Cheltenham, England
Filed Feb. 14, 1966, Ser. No. 527,185
Claims priority, application Great Britain, Feb. 16, 1965,
6,661/65
14 Claims. (Cl. 244—75)

ABSTRACT OF THE DISCLOSURE

An aircraft is provided with laterally projecting control members each formed with elongated apertures on opposite sides of a bluff trailing edge portion, and means for selectively discharging boundary layer control streams through different apertures in opposing directions thus producing opposed lift and hence induced drag to retard the aircraft. The control members may be arranged in a cruciform or inverted T and the same control members can be employed to provide normal aileron, rudder or elevator control functions.

---

Figure 1:
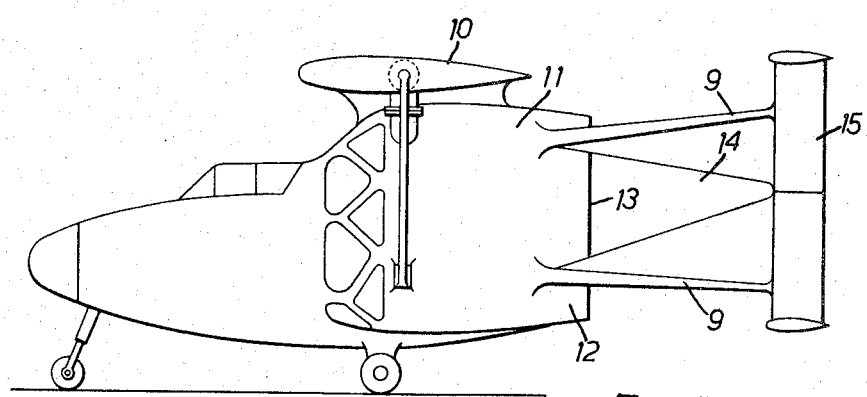

This invention relates in general to apparatus for applying braking or retarding forces to vehicles.

The invention is primarily though not exclusively applicable to aircraft, more especially S.T.O.L. and V.T.O.L. aircraft, but may also be applied to hovercraft, snowsleds, certain types of hydrofoil machines and rotorcraft, conventional fixed wing aircraft, variable geometry and stowable aircraft and specialised types of wheeled vehicles including high speed track laying machines. In all such cases the invention is particularly applicable to jet propelled vehicles. The invention may also be applied to marine craft, including surface vessels and submersibles. For convenience the following description of the invention is related to aircraft.

It is an object of the invention to provide a vehicle with an improved aerodynamic or hydrodynamic braking means which is less dependent upon the forward speed of the vehicle through the fluid medium in which it travels than is the case when using conventional dynamic braking devices.

The invention consists broadly in a vehicle including braking means comprising a control member or members exposed to a main fluid stream and provided with one or more elongated apertures extending transversely to the normal direction of forward movement of the vehicle, and means for discharging one or more fluid control streams through the said aperture or apertures to effect boundary layer control over the surfaces of the said control member or members, causing or contributing to deflection of said main fluid stream simultaneously in opposed directions over different sections of said member or members, to create a retarding force on the vehicle. Preferably the same control members can also be used selectively to effect either directional control, attitude control, or dynamic braking, or any combination of these control modes separately or simultaneously.

From one aspect the invention is based on the known Coanda effect, in which dynamic lift of substantial magnitude is obtained by boundary layer control causing circulation or partial circulation of a fluid stream around a body moving in a main linearly flowing fluid stream, the direction of lift depending upon the direction of circulation.

The flight propulsion means may include an airscrew, ducted fan or gas turbine engine, and the invention is particularly applicable to by-pass gas turbine engines mounted adjacent to or on the rear portion of the machine while the braking means may be mounted to the rear of the flight propulsion means within the flow therefrom, whereby the braking means is assisted in developing adequate braking forces, particularly at low forward speeds of the machine.

In other applications where propulsive stream assistance may not be necessary in making adequate braking forces available, the propulsion means may be divorced from or mounted down-stream of the braking means which in turn may be mounted on the nose of the aircraft with the main lifting surfaces at the rear of the aircraft.

Where the engines are of the bypass type of gas turbine the bypass air may be diverted from the axis of the engine rotating shaft and collected into a main propulsive duct or ducts independent from the high temperature propulsive jet stream issuing from the final nozzle of the engine in order that the bypass air should be co-ordinated in relationship with the braking means.

The braking means can be so arranged that it is also possible to provide other forms of controlling forces on the vehicle, for example rolling movements, rudder and elevator functions, or combinations thereof. Thus in a preferred form of the invention the braking means is arranged in such a manner that by control of a gas discharged from the apertures of the control members in opposition, substantial induced drag can be created which may be used for retardation of the vehicle, and the gas discharge may be coupled with automatic velocity control so as to regulate for example the speed of approach and landing of an aircraft. It will be understood that the generation of lifting forces on any aerodynamic member produces a drag which is identified as "induced drag" in order to distinguish from profile drag which does not produce lifting forces. The action of this braking function is effective in a manner similar to a variable area parachute where the area would be under the control of the velocity sensing device, but where the propulsive stream is maintained at substantially cruise rating during the descent and landing phase of flight.

The control system gain can be varied by control of the supply pressures to the systems. This may be varied by the pilot, automatically by sense of ambient pressure, or by any combination of these, to suit particular requirements.

The braking means may be used in a manner which obviates the necessity for movable control surfaces or alternatively the braking means may be used to supplement the control effect of moving members. Irrespective of the foregoing it may be necessary particularly in applications which do not embody full authority auto-stabilising controls to utilise the braking means in conjunction with substantially fixed aerodynamic fins to effect "weather vaning" of an aircraft. These fins may be arranged to cooperate longitudinally with the braking means or may be mounted independently on the same longitudinal axes or displaced angularly so as to provide substantially fixed fin members interspaced between the blown members of the stabiliser. In order to reduce aerodynamic resistance to a minimum, when braking is not required, residual flow can be emitted equally from cooperating apertures to effect streamlining without producing control forces. Where the control fluid streams for the boundary layer control are derived from gas turbine bleed air, or main engine driven compressors, it may be desirable to couple the regulation system to a controlled by-pass and propulsion air duct which can be regulated in unison with the control valve system in order to effect optimum matching under different load conditions. Where residual loads are necessary on the control member in order to maintain a given attitude of the aircraft, angular trim correction devices may be embodied in the otherwise fixed stabilising fins, which may be the control members themselves.

Variable sweep-back elliptical control members which can reduce drag at high speed may be arranged to have simultaneous variation of the angle of incidence so that selection of a certain degree of sweep-back and hence incidence can effectively eliminate the need for asymmetric boundary layer control of the members in order to support a given residual load.

The air control valves can be embodied into an integrated unit which may be mechanically coupled to the pilot's control column or may be the fulcrum of the control column itself. Auto-stabilisation controls may be coupled directly to the mechanical linkage or may operate separate air bleed or feed valves.

The control valve system may comprise multiplex units irrespective of the provision of independent blowing air supplies and may be arranged to feed to independent controlling apertures in the surface of the control members. The control column could be spring centralised with trim adjusters but, if required, aerodynamic feel simulators can superimpose influence upon the centralising mechanism.

Aerodynamic braking by supply of blowing air to the control member can be effected through the medium of the control valves in a manner which will not disrupt pilot or auto-stabiliser authority of aircraft attitude control.

In the case of an aircraft, the main lifting surfaces may incorporate some blown feature such as jet flaps, or there may be provided some form of variable geometry devices such as deflectable flaps, or variable sweep-back. In such case the automatic velocity control, which applies its influence through the control members having boundary layer control, may also be used to select the desired amount of wing blowing or variable geometry or both, on the main lifting surfaces. The influence on the main lifting members would be dependent upon the actual flight velocity and not referred to the selected velocity as in the case of braking.

It will be appreciated that induced drag braking can be applied by any form of deflecting surface or powered lift system such as a jet flap control. However, since the braking functions may be required to operate at or near the landing speed of the aircraft, conventional deflecting surfaces which are of reduced effectiveness, due to the relatively low forward speed and jet flap and similar powered lift systems, which although capable of sustaining high unit loadings coincident with large induced drag, are not capable of operating with large incidence variations due to a phenomena known as "bubble separation." The high unit loading necessary for induced drag braking via the boundary layer control members may be shown to be commensurate with the loading for performing the rolling functions normally accomplished by ailerons and in consequence an optimised arrangement can be achieved.

When the vehicle makes use of the braking features of the invention, it may be desirable to make this mode effective by pilot's selection of automatic velocity control. This is particularly relevant to machines which are required to land at speeds below the minimum drag speed of the particular aircraft where manual control of both velocity and attitude are made difficult. The engine can be left at substantially the cruise rating for descent and landing, making immediate power available during "wave off."

Figure 2:
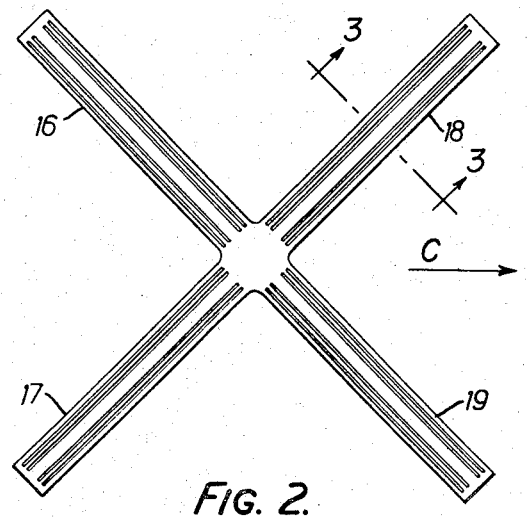
Figure 3:
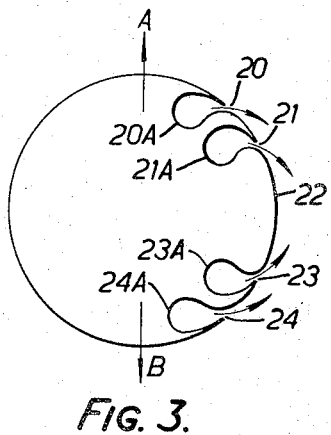
Figure 4A:
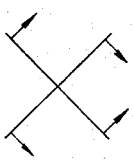
Figure 4B:
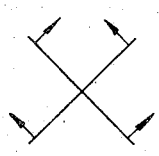
Figure 4C:
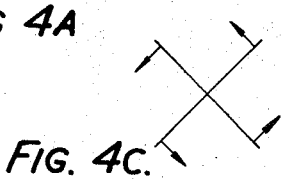
Figure 4D:
Figure 5:
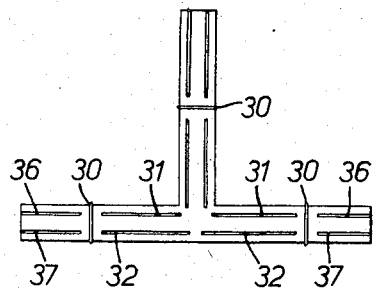
Figure 6:
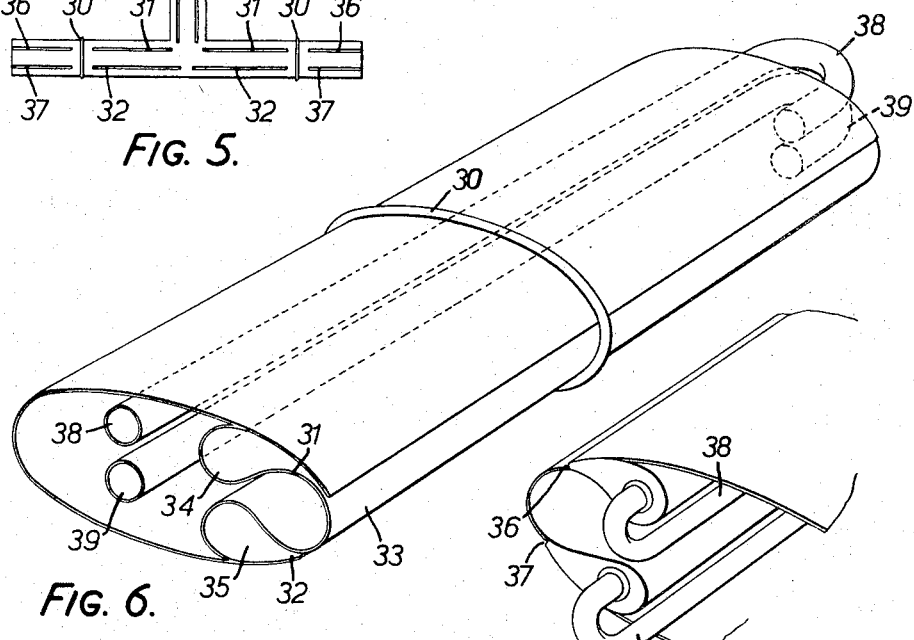
Figure 6A:
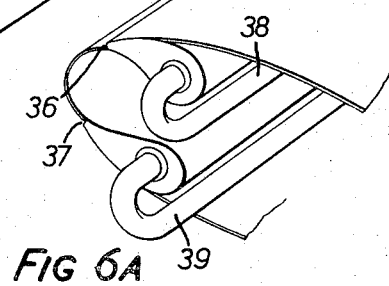
Figure 7A:
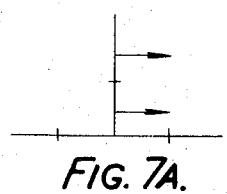
Figure 7B:
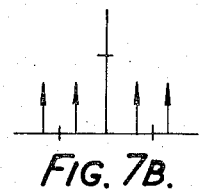
Figure 7C:
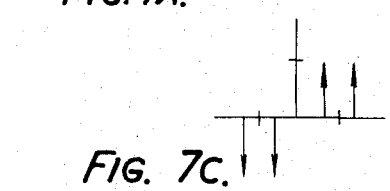
Figure 7D:
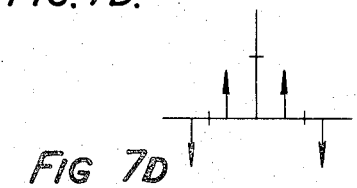
Figure 8A:
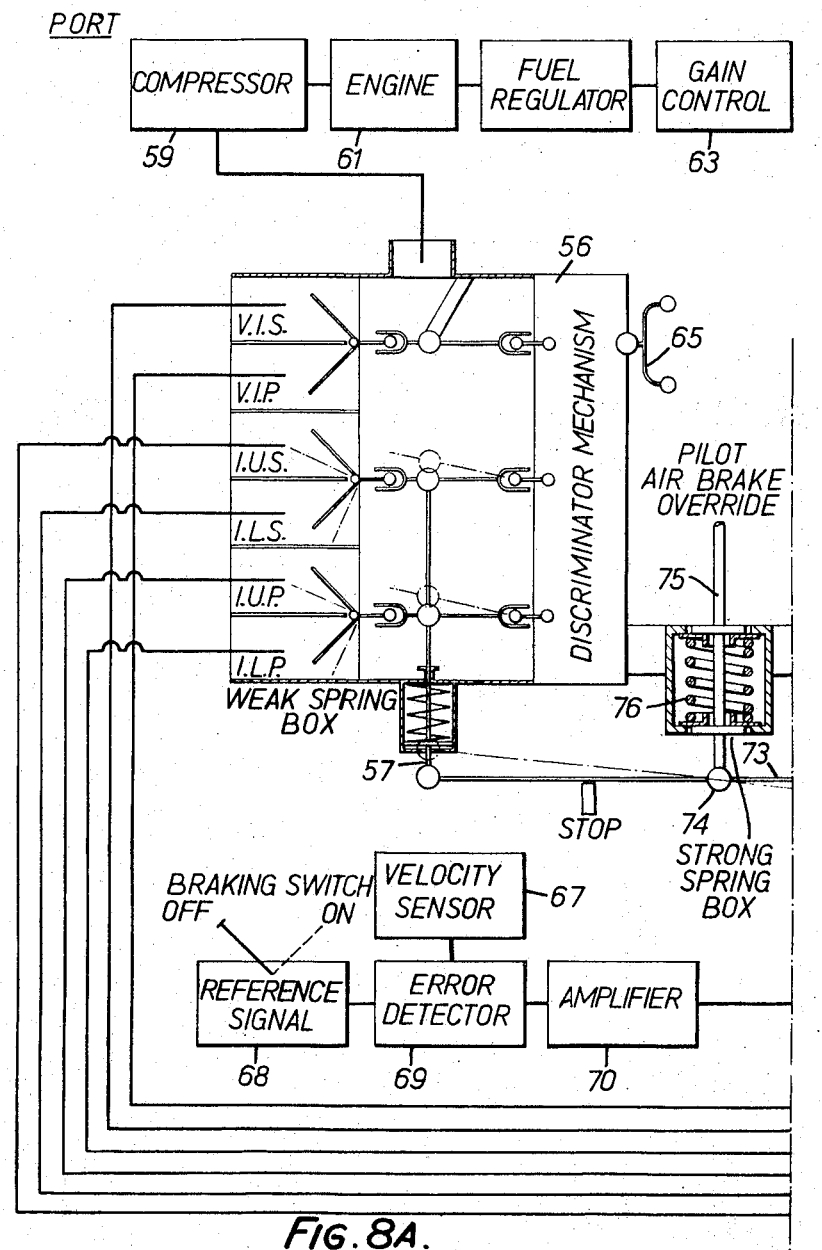
Figure 8B:
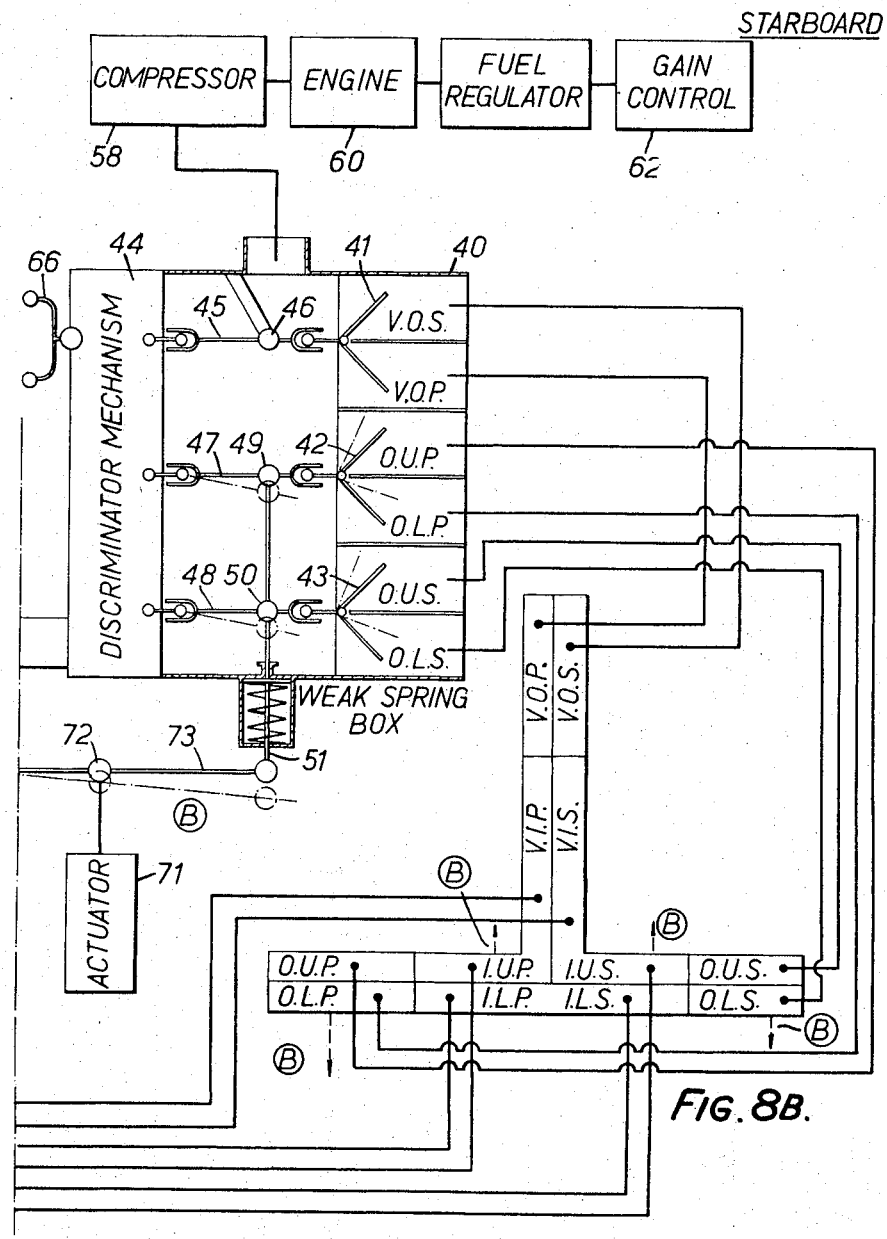
Figure 9:
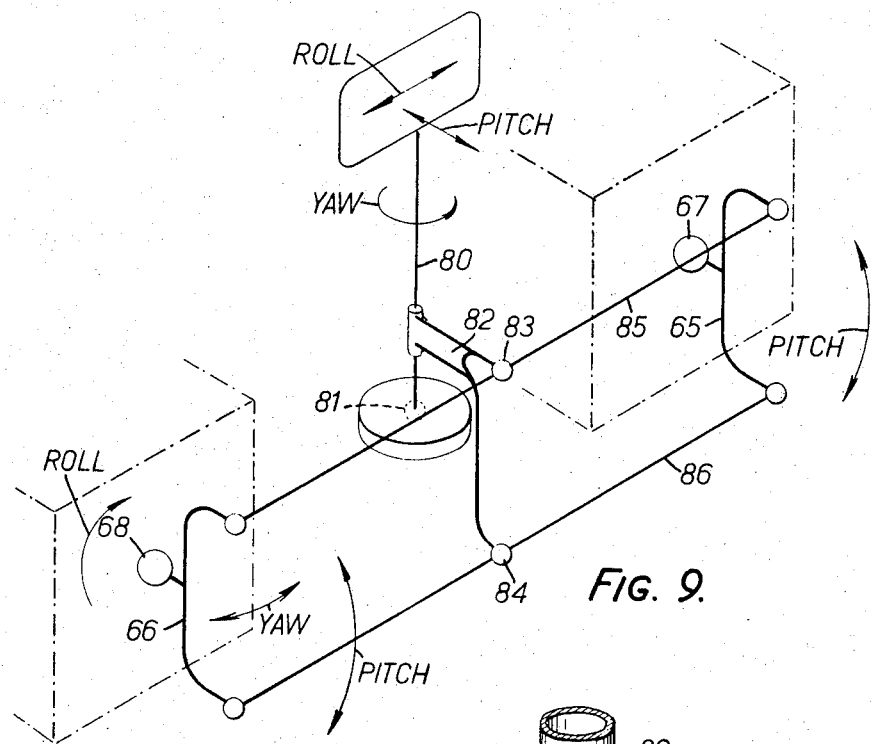
Figure 10:
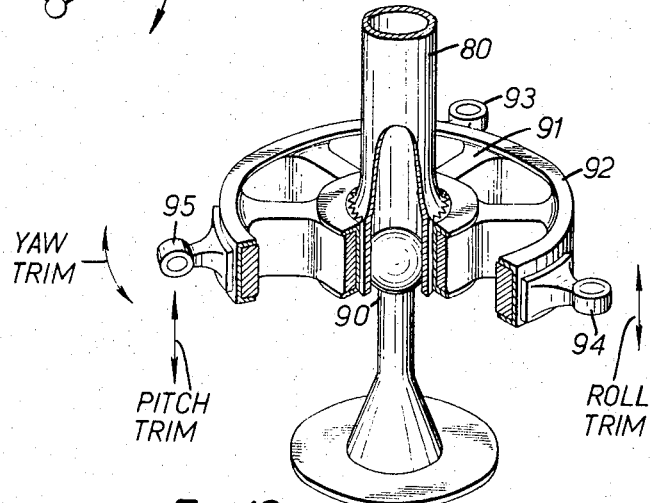
Figure 11:
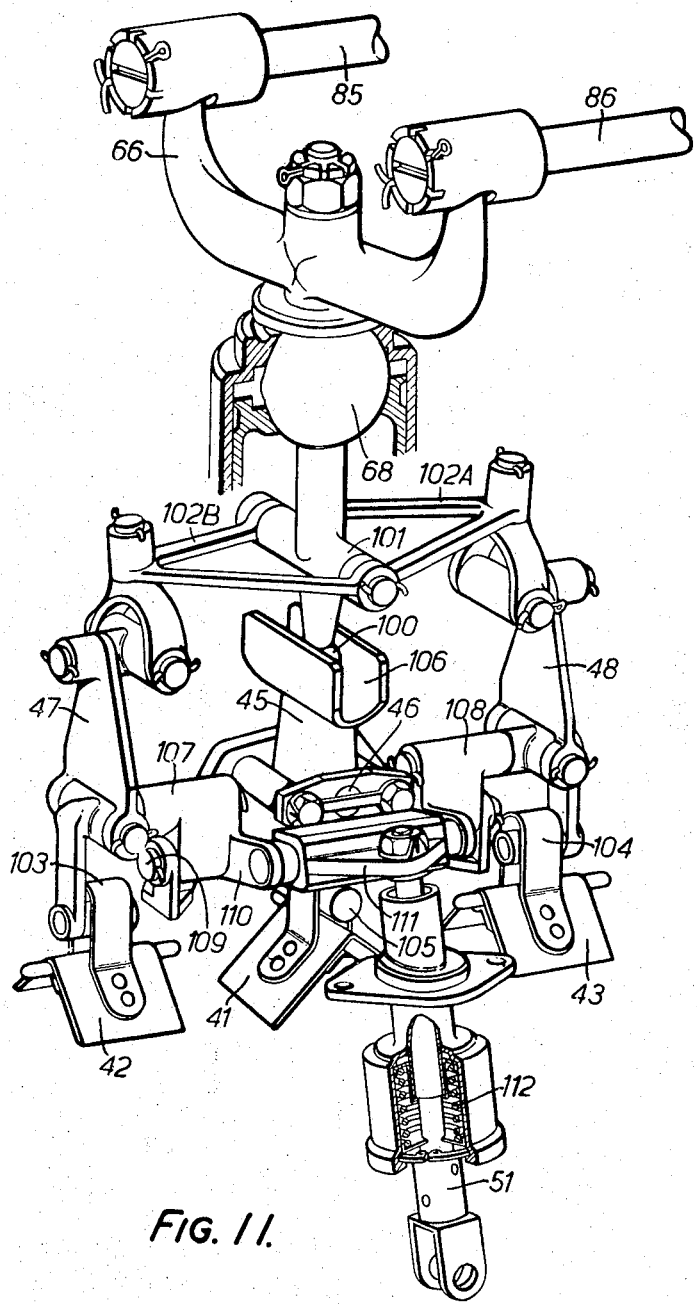
Figure 12:
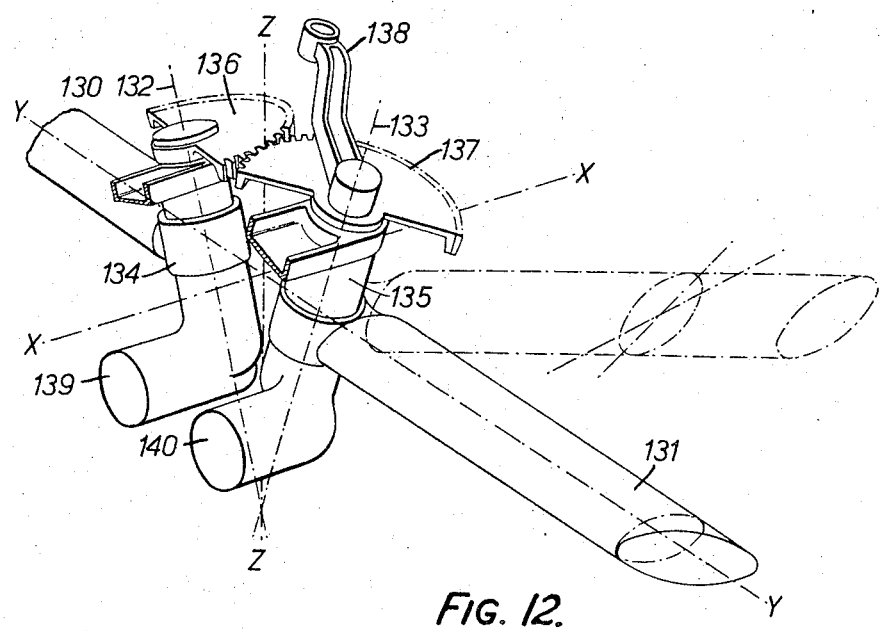
Figure 13:
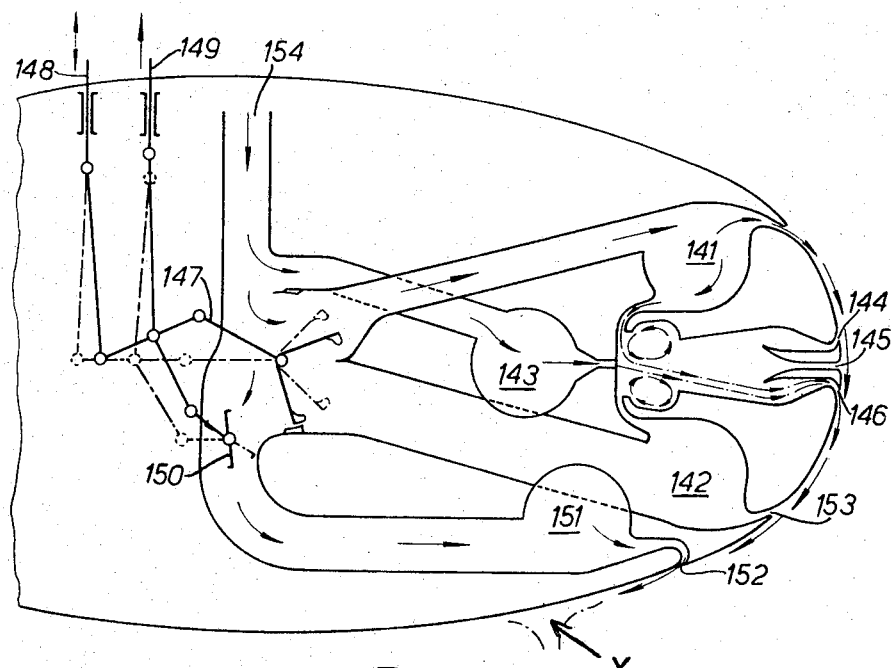

The invention may be performed in various ways and a number of specific embodiments will now be described by way of example with reference to the accompanying drawings, in which FIGURE 1 is a side elevation of a S.T.O.L. aircraft incorporating boundary layer control members according to the invention, FIGURE 2 is a rear view on an enlarged scale of the boundary layer control members of FIGURE 1, FIGURE 3 is a cross-section on an enlarged scale on the lines III—III in FIGURE 2 of one of the boundary layer control members, FIGURES 4A to 4D are diagrammatic views illustrating various control modes that can be achieved by the cruciform arrangement of FIGURE 2, FIGURE 5 is a rear view corresponding to FIGURE 2 of an alternative arrangement of control members in the form of an inverted T, FIGURE 6 is a perspective view of one of the control members of FIGURE 5, FIGURE 6A is a fragmentary perspective view of the opposite end of the control member of FIGURE 6, FIGURES 7A to 7D illustrate various control modes that can be achieved by the control member of FIGURE 5, FIGURE 8 is a schematic illustration of a control system controlling the supply of gas to the apertures of an inverted T control member as illustrated in FIGURES 5 and 6, FIGURE 9 is a diagrammatic illustration of the connections between a pilot's control column and the control system of FIGURE 8, FIGURE 10 is a somewhat diagrammatic perspective view, partly broken away, and on an enlarged scale, of the mounting system for the control column of FIGURE 9, FIGURE 11 is a perspective view of a constructional embodiment of the discriminator mechanism included in the control system of FIGURE 8, FIGURE 12 is a diagrammatic perspective illustration of a system for adjusting the angle of sweep-back in co-ordination with the angle of incidence of a control member according to the invention, and FIGURE 13 is a diagrammatic illustration, partly in cross-section, of a further modification of the invention.

The aircraft illustrated in FIGURE 1 is a S.T.O.L. machine having a main lifting wing 10 and is powered by a reciprocating piston or gas turbine engine indicated at 11, driving a ducted fan 12 from which an airstream is propelled rearwardly through the annular outlet aperture 13 surrounding a rearwardly extending cone 14. At the rear of the machine a cruciform assembly 15 of boundary layer control members is supported by means of struts 16, the assembly thus lying in the main propulsive airstream produced by the ducted fan.

The assembly 15 is cruciform as seen in the rear view of FIGURE 2 and comprises four hollow cylindrical control members 16, 17, 18, 19 arranged diagonally. Each control member is of substantially circular cross-section as seen in FIGURE 3 and has two elongated apertures 20, 21 above the bluff smooth convex trailing edge portion 22 and two elongated apertures 23, 24 on the other side of the trailing edge. Air is supplied under pressure through longitudinally extending ducts 20A, 21A, 23A, 24A, within the respective control members and control means are provided for selectively discharging air either from the apertures 20 and 21 in order to effect partial clockwise circulation of the airstream about the member, or alternatively from the apertures 23 and 24 in order to obtain partial counterclockwise circulation. The ducts 20A and 24A communicating with the outermost apertures are supplied by a compressor driven by one auxiliary engine, while the two inner ducts 21A and 23A are supplied from a separate compressor driven by another auxiliary engine. Thus in the event of a failure in one auxiliary engine there will still remain one effective discharge aperture on each side of the trailing edge.

It will be understood that depending upon the direction of circulation or deflection of the airstream, aerodynamic lift will be exerted by the control member either in the direction of arrow A or of arrow B in FIGURE 3, arrow C representing the direction of flow of the main airstream impinging on the member. By appropriate control of the individual control members it is therefore possible to obtain selectively or in combination all normal control functions, and also aerodynamic braking, as illustrated in FIGURES 4A and 4D. In FIGURE 4A the air discharge to the individual control members is so controlled that the resulting aerodynamic lift indicated by the arrows is fully balanced in a vertical direction but has an overall resultant in a horizontal direction thus providing the effect of a conventional rudder. In FIGURE 4B the individual lift forces oppose one another in a horizontal direction but produce a resultant thrust in a vertical direction corresponding to a normal elevator function. In FIGURE 4C all four component lift forces apply torque to the control member assembly about its centre thus corresponding to the roll function of conventional ailerons. In FIGURE 4D the individual lift forces oppose and balance one another in both the vertical and horizontal planes. Since the generation of these lift forces necessarily involves induced dynamic drag the result of this control mode is to apply aerodynamic braking without applying directional or attitude control to the aircraft. It will be understood that by appropriate selections and combinations of the basic control modes illustrated all normal flight control manoeuvres can be achieved together with the additional aerodynamic braking. As forward speed is increased the effectiveness of the induced drag braking will be reduced and this is of advantage since it reduces any hazard, which could arise from system malfunction.

In the alternative design illustrated in FIGURE 5 there are three main control members arranged in the form of an inverted T, each member being elliptical in cross-section as illustrated in FIGURE 6. Each member is divided lengthwise by a plate 30 which separates one end of the interior of the member from the other and which also projects externally as a shallow flange. At the trailing edge of the member elongated apertures 31, 32 are provided on opposite sides of a rounded trailing edge portion 33. Compressed air for the inboard upper aperture 31 is supplied through a duct 34 and air for the lower inboard aperture 32 is supplied through a duct 35. Air for the corresponding outboard upper and lower apertures 36, 37 is supplied from the inboard end of the member through pipes 38, 39 which pass through the partition 30 and are connected to the apertures as illustrated in FIGURE 6A.

With this system it is possible to obtain individual selective control of the inboard and outboard sections of each control member. Some of the control modes obtainable are illustrated in FIGURES 7A to 7D. In FIGURE 7A the inboard and outboard sections of the vertical control member both have the blowing biassed in the same direction but there is no bias of the air supplied to the horizontal member. This provides rudder function. In FIGURE 7B there is biassed blowing of all four horizontal sections but the vertical member is blown symmetrically, the combined effect being to provide elevator function. In FIGURE 7C there is biassed blowing of the port and starboard sections of the horizontal member in opposite directions and this provides roll effect, while in FIGURE 7D the inboard and outboard sections of each of the port and starboard horizontal members are bias blown in opposite directions thus balancing out the resulting lift but generating induced drag to give aerodynamic braking. Again a great variety of control functions can be obtained by combinations of the basic control modes illustrated.

The cruciform embodiment of FIGURE 2 may be more effective than the inverted T embodiment of FIGURE 5 in braking and rolling in that it utilises all the members available for these purposes. The cruciform is however less efficient in elevator rudder functions.

A control system for use with the inverted T arrangement of FIGURE 5 is illustrated in FIGURES 8 to 11. In FIGURE 8 the twelve individual aperture sections of the control member asembly are shown diagrammatically and marked with letters indicating their position; O indicating outer, I indicating inner, U indicating upper, L indicating lower, P indicating port, S indicating starboard, and V indicating vertical. The six outboard aperture sections are supplied with compressed air through six ducts connected in pairs to a multiplex valve indicated generally at 40. This valve includes three pivoted butterfly type valve members 41, 42, 43, each butterfly valve member being associated with a pair of apertures lying on opposite sides of the trailing edge of one portion of the control member assembly. Thus as the butterfly valve member is pivoted the air flow to one aperture is increased and the air flow to the other aperture is reduced to provide aerodynamic circulation in the required direction. Each butterfly valve member is connected to a lever and engaged in a bifurcated part on one end of an operating lever, the opposite end of each lever having a similarly bifurcated part which is actuated by a pivoted arm constituting the output of a discriminator mechanism 44. The first lever 45 controlling the air flow to the outboard section of the vertical control member has a fixed fulcrum 46. The remaining two pivoted levers 47 and 48 which control respectively the air flow to the apertures at the outboard port and starboard sections of the horizontal control members are fulcrumed at points 49 and 50, which are movable transversely by a lever 51 for a purpose which will be described below.

The apertures of the six inboard sections are similarly connected through six ducts to a second multiplex valve indicated generally at 55, the component butterfly valve member being actuated by similar discriminator mechanism 56 and the fulcrums of the inboard port and starboard sections being movable transversely by a rod 57.

Compressed air is supplied to each multiplex valve 40 and 55 by separate compressors 58, 59, each compressor being driven by an independent auxiliary engine 60, 61, these engines being controlled by fuel regulators which are automatically adjusted by gain control mechanisms 62, 63 arranged to control the respective engine output to produce the required air delivery pressure.

Each of the two discriminator mechanisms is controlled by an associated stirrup member 65, 66, the two stirrup members each having three degrees of movement as will be described in more detail with reference to FIGURES 9, 10 and 11.

In order to obtain aerodynamic braking by the control mode illustrated in FIGURE 7D air is supplied under pressure to the I.U.P. and I.U.S. apertures and also to the O.L.P. and O.L.S. apertures. This braking effect can be controlled automatically by means of an automatic velocity controller. This controller includes a velocity sensor 67 providing a signal which varies with the air speed of the aircraft, a separate selector or reference signal generator 68, which provides a signal proportional to the desired air speed, an error detector 69, which compares the signals from the unit 67 and 68 and produces a control signal which is a function of the difference between the signals, or error, an amplifier 70 which amplifies this control signal, and an electric actuator 71 acting through a rod 72 pivotally attached to a beam 73, to cause this beam to tilt in accordance with the error speed. The beam 73 is centrally pivoted at 74 on one end of a normally stationary rod 75 and the opposite ends of the beam are pivotally connected to the actuating rods 51, 57, associated with the two multiplex valves. It will be seen that downward movement of the actuator rod 72 causes downward movement of the rod 51 and corresponding upward movement of the rod 57. This results in compressed air being delivered to the O.L.S., O.L.P., I.U.S., and I.U.P. apertures which in turn will result in lifting forces as illustrated in FIGURE 7D and aerodynamic braking by induced drag.

As stated the rod 75 is normally stationary. This is achieved by means of a centralising spring 76 acting between movable abutment sleeves which engage spaced flanges on the rod and are also located by fixed abutments, so that the rod 75 is always urged into a central position. The rod 75 is under the pilot's control and if at any time the pilot wishes to override the operation of the automatic velocity controller he can by appropriate movement of this rod rock the beam 73 into a substantially horizontal position as shown in FIGURE 8 thus cancelling the action of the velocity controller, or alternatively he may select braking manually by pivotting the beam 73 about the actuator rod pivot 72.

The pilot's control column is indicated at 80 in FIGURE 9. The column is universally pivoted at its lower end 81 in a spherical joint, which is illustrated in more detail in FIGURE 10. In addition to the normal control movements in a forward-to-rear direction to provide pitch control and in a port-to-starboard direction to provide roll control, the column is also capable of pivotal movements about its own axis to provide yaw control. Mounted on the control column 80 is a control stirrup 82 having two projecting arms attached by universal ball joints 83, 84 to a pair of parallel horizontal control rods 85, 86. The opposite ends of these control rods are connected by ball joints to respective arms of the discriminator mechanism control stirrups 65, 66. Each of the control stirrups 65, 66 is mounted for universal movement about a spherical joint 67, 68, these two joints lying on a common axis intersecting the centre of the control column spherical joint 81. Thus it will be seen that movements of the control column 80 in any one of its three freedoms of movement will be applied as identical movements to both of the control stirrups 65, 66, although the direction of movement will be altered due to the fact that the axes of the stirrups 65 and 66 are perpendicular to the axis of the control column 80.

It is preferable to provide means for adjusting the centre or null position of the control column in all three directions of movement and as illustrated in FIGURE 10 the lower end of the column 80 is formed as a hollow tubular part fitting over a stationary spherical member 90 and the external surface of this tubular part is serrated and attached to a spoked elastic centering member 91 having a peripheral rim 92. Three apertured adjusting lugs 93, 94, 95 are attached to this rim and means are provided (not shown) for adjusting these lugs in the desired direction. Thus by moving the lug 95 circumferentially yaw trim adjustment is obtained, by moving the lug 95 vertically pitch trim is obtained, and by moving the lug 94 vertically, moving the peripheral rim 92 substantially about pivot 93, roll trim is obtained.

One of the discriminator mechanisms is illustrated in FIGURE 11. The control stirrup 66 actuated by the control rods 85, 86 is rigidly connected to a unitary member which includes the central spherical part of the spherical joint 68, a downwardly projecting rod having a ball 100 at its lower end, and a transverse pivotal sleeve 101 at an intermediate point. This sleeve 101 accommodates a pivot pin on which are fulcrumed double-armed levers 102A and 102B. The ends of these levers 102A and 102B are connected through universal joints, each comprising three orthogonal pivots, to a pair of actuating levers which correspond to the actuating lever 47, 48 illustrated in FIGURE 8. The opposite ends of these actuating levers carry pins slidably engaging in slotted parts 103, 104 providing the mechanical equivalent of the bifurcated parts illustrated in FIGURE 8. These levers 47, 48 thus control the butterfly valve members 42, 43, each of which is pivoted on a stationary axis. The third butterfly member 41 is actuated through a similar slotted member by a pin 105, which is formed rigid with a part 45 corresponding to the actuating lever 45 of FIGURE 8, this part being pivoted on a stationary axis at 46. The upper end of this part 45 is formed with a channel member 106, which is closely engaged by the ball 100 attached to the stirrup 66.

Thus it will be seen that any selection or combination of the three possible degrees of movement of the stirrup 66 will be in effect differentiated or segregated and applied as control movements to the three butterfly valve members 41, 42, 43.

Each of the actuating levers 47, 48 is pivotally mounted on a movable member 107, 108, these two members being in turn pivotally mounted on a stationary axis 109 and having actuating levers 110 interconnected by a cross bracket 111. The bracket 111 is connected to the tie rod 51 with which is associated a weak spring centralising device 112. The device 112 provides a reference datum in the event of breakage associated with the beam 73 (FIGURE 8) and obviates the effects of back lash in the pivots associated with the members 51, 57, 72, 73, and 74. The rod 51 is connected to one end of the tilting beam 73 as illustrated in FIGURE 8.

In the further modification illustrated in FIGURE 12 a pair of normally horizontal control members 130, 131, each of elliptical cross-section, are mounted on the air frame in a manner which permits adjustment of both the sweep back angle and the angle of incidence of the members. For this purpose the two members are mounted respectively on pivotal axes 132, 133 lying in a common plane perpendicular to the fore-and-aft axis of the aircraft and inclined outwardly from the vertical, each at an angle of, for example, 15° to axis Z—Z. Each control member is secured to a rotatable sleeve 134, 135 and is inclined at the same angle to a plane perpendicular to the respective pivotal axis. Thus when the sleeves 134, 135 are both rotated to a position in which the control members lie in a common plane perpendicular to the fore-and-aft axis of the aircraft the two stabiliser members will be horizontal at substantially zero incidence relative to axis X—X, or preferably relative to the flight axis at low speed, the flight axis being inclined relative to X—X in order to achieve the desired lift of the main planes. When the sleeves 134 and 135 are rotated the control members will pivot about axes 132, 133 and their sweep-back angle can thus be adjusted to any selected value. As a result of the geometry of the parts the dihedral angle of the control members will increase as the sweep-back angle increases and this will correspondingly result in the change in the angle of incidence. In this particular example a negative angle of incidence will be produced as the sweep-back angle increases. In most circumstances a negative incidence angle will be desired at high speed in the case of a tail mounted control member, but if in any particular application a positive angle of incidence is required as the sweep-back angle increases, this can be achieved by inclining the two pivotal axes 132, 133 outwardly and downwardly, with corresponding alteration in the fixed angle between each control member and its pivotal axis. Braking can be achieved by regulation of boundary layer control air flow as previously described with reference to FIGURE 7D.

The two operating sleeves 134, 135, carrying the control members, are each attached to intermeshing toothed segments 136, 137, so that each sleeve moves through the same angle, and the sleeves are operated by a crank arm 138 attached to one of the segments. Compressed air to the apertures on the control members is supplied through ducts 139, 140, the individual ducts being omitted from this drawing for clarity.

The above described modification including variable sweep back angle is particularly applicable where the aircraft is required to operate over a wide speed range approaching sonic conditions. In applications where the dihedral component associated with sweep back is undesirable the pivot axes 132 and 133 can be appropriately inclined with respect to the vertical axis Z—Z of FIGURE 13, with corresponding correction to restore substantially zero incidence relative to the aircraft axis X—X when the members 130 and 131 are in the extended low speed configuration.

The foregoing description has been related to fixed area apertures where the mass flow is varied by control of pressure. The principles described would be equally applicable if variable area apertures were employed. Variable area may be accomplished by mechanical variation, switching of parallel coupled apertures or by fluid logic techniques utilised to vary the discharge coefficient of the apertures or to effect parallel switching. Where resilient elements and constant supply pressures are to be used, the control valves can be of the venturi type which would minimise the transmission energy losses. However, the most straightforward method of control is to employ simple throttle valves, and the valves illustrated herein have been confined to this type for ease of understanding.

FIGURE 13 shows a further modification of the invention. The drawing is a diagrammatic cross-section through a control member of substantially elliptical cross-section but differing from the previously described members in that in addition to normal blowing ducts 141 and 142 fed from a compressed air supply duct 154, there is a third central blowing duct 143 with which is combined a fluid logic switch which determines the exit path from the central duct 143 into apertures 144, 145 and 146. The central aperture 145 is directed rearwardly, while each of the side apertures 144, 146 is directed outwardly.

When the pressure in ducts 141 and 142 is substantially equal, the jet leaving central duct 143 is directed to the central aperture 145. Movement of a bifurcated butterfly valve lever 147 in an inward direction via input control rod 148 increases the flow to duct 141 and reduces the flow to duct 142, and vice versa. The resultant pressure differential acts on the fluid logic switch to cause the jet leaving central duct 143 to be deflected downwardly and become attached to the lower boundary wall of the switch so that the flow is discharged through the lower central aperture 146, in the same direction of circulation as the air issuing from aperture 141. Still further movement of the valve control lever 147 effectively closes the supply to duct 142, regulation of the circulation remaining effectively controllable by the further increase in air supply available to duct 141.

The description of boundary layer control related to FIGURE 13 is in respect of clockwise circulation to effect an upward lift. The reverse conditions apply in respect of anticlockwise circulation to effect downward lift.

When induced drag braking is selected, as for example in the control modes of FIGURES 4D and 7D, it may be necessary to augment the circulation effect in order to obtain the desired lift force and hence degree of braking. The embodiment of FIGURE 13 provides means for influencing the circulation to the extent that the stagnation point is moved to a point X which is upstream of aperture 153 in FIGURE 13. For this purpose the control member is provided with a further forwardly directed aperture 152, fed from an air duct 151. Movement of a braking rod 149, in addition to biassing the bifurcated valve linkage lever 147 to the point of closing off air supply to duct 142 without moving the normal valve control rod 148, also progressively opens a butterfly valve 150 to cause air to flow into the braking air duct 151 and aperture 152, thus augmenting the clockwise circulation induced by the flow from duct 141 and aperture 146. The circulation thus shifts the stagnation point to the approximate position of point X, which materially increases the upward lift generated, and hence the induced drag.

I claim:

1. A vehicle including braking means comprising a control member or members exposed to a main fluid stream and provided with one or more elongated apertures extending transversely to the normal direction of forward movement of the vehicle, and means for discharging one or more fluid control streams through the said aperture or apertures to effect boundary layer control over the surfaces of the said control member or members, causing or contributing to deflection of said main fluid stream simultaneously in opposed directions over different sections of said member or members, to create a retarding force on the vehicle.

2. A vehicle as claimed in claim 1, comprising at least two such control members each extending transversely to the direction of forward movement, the two control members being mutually inclined to one another when viewed in the direction of forward movement.

3. A vehicle as claimed in claim 1, in which the trailing edge of the or each control member is curved in cross-section and the or each control member has elongated aperatures on both sides of the trailing edge thereof, and including means for selectively discharging fluid through a selected one of said apertures to effect partial fluid mainstream circulation about the member or members selectively in either direction.

4. A vehicle as claimed in claim 3, in which the or each control member is of non-circular cross-section and including means for adjusting the angle of incidence of the control member during forward movement.

5. A vehicle as claimed in claim 1, in which the or each control member is pivotally connected to the vehicle to provide variable sweep-back.

6. A vehicle as claimed in claim 1, in which the or each control member is of curved non-circular cross-section and including means for adjusting the angle of incidence of each control member during forward movement, and in which the control member is pivotally connected to the vehicle to provide variable sweep-back, and including means for controlling the degree of sweep-back in coordination with the angle of incidence of the control member.

7. A vehicle as claimed in claim 1, in which the control members, the apertures therein, and the fluid discharge means are arranged to create dynamic lift forces which are substantially normal to the direction of forward movement but in opposition to each other, thus providing dynamic braking of the vehicle.

8. A vehicle as claimed in claim 7, including a selectable automatic velocity controller, sensitive to the forward speed of the vehicle, and fluid regulating means actuated by said velocity controller and controlling the supply of fluid to said apertures to vary the dynamic braking effect automatically in a sense to maintain a selected forward speed.

9. A vehicle as claimed in claim 8, including means for manually overriding the automatic velocity controller when required.

10. A vehicle as claimed in claim 1, including individual valves controlling the flow to the respective apertures, and regulator means arranged to discriminate between yaw, pitch, roll, and braking signals applied thereto, and to translate these signals into individual flow control signals applied to said valves.

11. A vehicle as claimed in claim 10, including variable gain control of the braking means comprising means for varying the pressure of the control fluid streams supplied to said apertures.

12. A vehicle as claimed in claim 7, including a fluid displacing main propulsion engine, and in which the or each control member is positioned at least partly in the fluid stream created by the engine, thus improving the low speed handling characteristics of the vehicle.

13. A vehicle as claimed in claim 7, including at least one controllable aperture positioned on one side of the trailing edge of the or each control member, and directed to cause fluid circulation in the same direction, as an aperture on the other side of the trailing edge.

14. A vehicle as claimed in claim 13, in which the controllable aperture is positioned upstream, in relation to the direction of flow of the main fluid stream, of a further fluid discharge aperture on the same side of the trailing edge, the latter discharge aperture being directed to cause fluid circulation in the opposite direction.

References Cited
UNITED STATES PATENTS

| | | | |
|---|---|---|---|
| 2,406,916 | 9/1946 | Stalker | 244—42.41 |
| 2,664,700 | 1/1954 | Benoit | 239—265.25 |
| 2,939,650 | 6/1960 | Coanda | 244—42.41 |
| 3,062,483 | 11/1962 | Davidson | 244—42.41 |

FOREIGN PATENTS

| | | |
|---|---|---|
| 222,845 | 5/1925 | Great Britain. |
| 597,674 | 5/1925 | France. |

ANDREW H. FARRELL, *Primary Examiner.*